United States Patent
Kothari et al.

(10) Patent No.: US 8,753,209 B2
(45) Date of Patent: Jun. 17, 2014

(54) DEDICATED DEVICE PORTS FOR DATA EXCHANGE

(75) Inventors: Ronak Kothari, Bangalore (IN); Mihir Gore, Bangalore-Karnataka (IN)

(73) Assignee: Adobe Systems Incorporated, San Jose, CA (US)

( * ) Notice: Subject to any disclaimer, the term of this patent is extended or adjusted under 35 U.S.C. 154(b) by 1628 days.

(21) Appl. No.: 11/848,899

(22) Filed: Aug. 31, 2007

(65) Prior Publication Data

US 2014/0038718 A1 Feb. 6, 2014

(51) Int. Cl.
G06F 17/00 (2006.01)
G06F 19/00 (2011.01)

(52) U.S. Cl.
USPC .............................................. 463/42; 709/204

(58) Field of Classification Search
USPC .............. 463/40–42; 709/203–206, 217–219, 709/227–231
See application file for complete search history.

(56) References Cited

U.S. PATENT DOCUMENTS

| | | | | |
|---|---|---|---|---|
| 5,738,583 A | * | 4/1998 | Comas et al. | 463/40 |
| 6,524,189 B1 | * | 2/2003 | Rautila | 463/40 |
| 6,785,561 B1 | * | 8/2004 | Kim | 455/566 |
| 6,846,239 B2 | * | 1/2005 | Washio | 463/40 |
| 6,874,029 B2 | * | 3/2005 | Hutcheson et al. | 709/227 |
| 6,893,347 B1 | * | 5/2005 | Zilliacus et al. | 463/41 |
| 7,125,336 B2 | * | 10/2006 | Anttila et al. | 463/40 |
| 7,257,386 B1 | * | 8/2007 | McDonnell et al. | 455/403 |
| 7,743,339 B1 | * | 6/2010 | Chanda et al. | 715/804 |
| 2003/0073494 A1 | * | 4/2003 | Kalpakian et al. | 463/42 |
| 2003/0142039 A1 | * | 7/2003 | Minear et al. | 345/2.3 |
| 2006/0179145 A1 | * | 8/2006 | Khawand | 709/227 |
| 2008/0096549 A1 | * | 4/2008 | Arrasvuori | 455/425 |
| 2008/0220875 A1 | * | 9/2008 | Sohl et al. | 463/42 |

* cited by examiner

Primary Examiner — Milap Shah (74) Attorney, Agent, or Firm — Schwegman Lundberg & Woessner, P.A.

(57) ABSTRACT

An apparatus includes a handheld device that has a virtual machine configured to execute applications and a port dedicated to transmitting and receiving data for the virtual machine. The handheld device also includes an application manager for assigning an application instance identifier to an instance of an application executed by the virtual machine.

16 Claims, 8 Drawing Sheets

| 602 Handheld Device Identifier (e.g., Cell Phone Number) | 604 Application Identifier | 606 Application Instance Identifier (e.g., four bit) |
|---|---|---|
| 1. (617) 521 – 6043 | 1. http://www.games.com/checkers | 1. |
|  | 2. http://www.games.com/crossword | 2. 4 |
|  | 3. http://www.games.com/baseball2007 | 3. 5 |
|  | 4. http://www.games.com/football2007 | 4. |
| 2. (508) 947 – 0094 | 1. http://www.games.com/baseball2007 | 1. 3 |
|  | 2. http://www.games.com/football2007 | 2. |
| 3. (212) 547 – 7081 | 1. http://www.games.com/baseball2007 | 1. 5 |

DEDICATED DEVICE PORTS FOR DATA EXCHANGE

BACKGROUND

The present disclosure relates to assigning ports of devices for dedicated use by virtual machines to exchange data.

Devices such as cellular telephones may be used to exchange various type of data and information. Along with placing and receiving telephone calls, cellular telephones may also exchange data such as text and electronic mail (email) messages. Typically, information exchanging may occur between two or more cellular telephones once the appropriate communication links have been established. For example, for multi-player games executed on cellular telephones, links may be established with three, six or even more cell phones for real time game play.

SUMMARY

In general, in one aspect, embodiments of the invention feature a method that includes assigning a port of a handheld device to a virtual machine executed on the handheld device for transferring data to at least another handheld device. An equivalent port of the other handheld device is assigned to a virtual machine executed on the handheld device. The method also includes assigning an application instance identifier to an instance of an application executed by the virtual machine of the first handheld device.

These and other embodiments can optionally include one or more of the following features. The application instance identifier can be sent from the first handheld device to the second handheld device. Another application instance identifier can be received at the first handheld device from the second handheld device. An application identifier can be previously assigned to the application and can be unique to the first handheld device. The application instance identifier can be unique to the first handheld device. The application instance identifier can be sent in a message such as a Short Message Service (SMS) message.

In another aspect, embodiments of the invention feature an apparatus that includes a handheld device that has a virtual machine configured to execute applications and a port dedicated to transmitting and receiving data for the virtual machine. The handheld device also includes an application manager for assigning an application instance identifier to an instance of an application executed by the virtual machine.

These and other embodiments can optionally include one or more of the following features. The port can be configured to send the application instance identifier to a port of another handheld device. The port of the other handheld device can be dedicated to a virtual machine of the other handheld device. The port can be configured to receive another application identifier from an equivalent port of another handheld device. The handheld device can include an identifier table for storing the application instance identifier. An application identifier can be previously assigned to the executed application. The virtual machine can include Adobe Flash Lite™. The port of the handheld device can be equivalent to the port of the other handheld device.

In another aspect, embodiments of the invention feature a system that includes a plurality of handheld devices that each include a port dedicated to a virtual machine. At least one message associated with an application executed on each handheld device is transferred over the dedicated ports. An application instance identifier is assigned to each instance of the application being executed on each of the plurality of handheld devices.

These and other embodiments can optionally include one or more of the following features. Each application instance identifier can be unique to the handheld device executing the application instance. Each application instance identifier can be provided to each handheld device executing an instance of the application. The application instance identifier can be provided in a message such as a Short Message Service (SMS) message.

In yet another aspect, embodiments of the invention feature a computer program product, encoded on a computer-readable medium, operable to cause data processing apparatus to perform operations including assigning a port of a handheld device to a virtual machine executed on the handheld device for transferring data to another handheld device. An equivalent port of the second handheld is assigned to a virtual machine executed on the second handheld device. Operations also include assigning an application instance identifier to an instance of an application executed by the virtual machine of the first handheld device.

These and other embodiments can optionally include one or more of the following features. The application instance identifier can be sent from the first handheld device to the second handheld device. An application instance identifier can be received at the first handheld device from the second handheld device. An application identifier can be previously assigned to the application and can be unique to the application. The application instance identifier can be unique to the first handheld device.

Particular embodiments of the subject matter described in this specification can be implemented to realize one or more of the following advantages. By dedicating a port to a virtual machine present in a handheld device, port identification information may remain absent from messages exchanged with one or more other handheld devices, thereby conserving processing resources and message space. Furthermore, by assigning a relatively small identifier to each application instance being executed by the virtual machine, a correspondingly small port of message space is needed for directing the message to the appropriate application instance executed by one or more other handheld devices.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
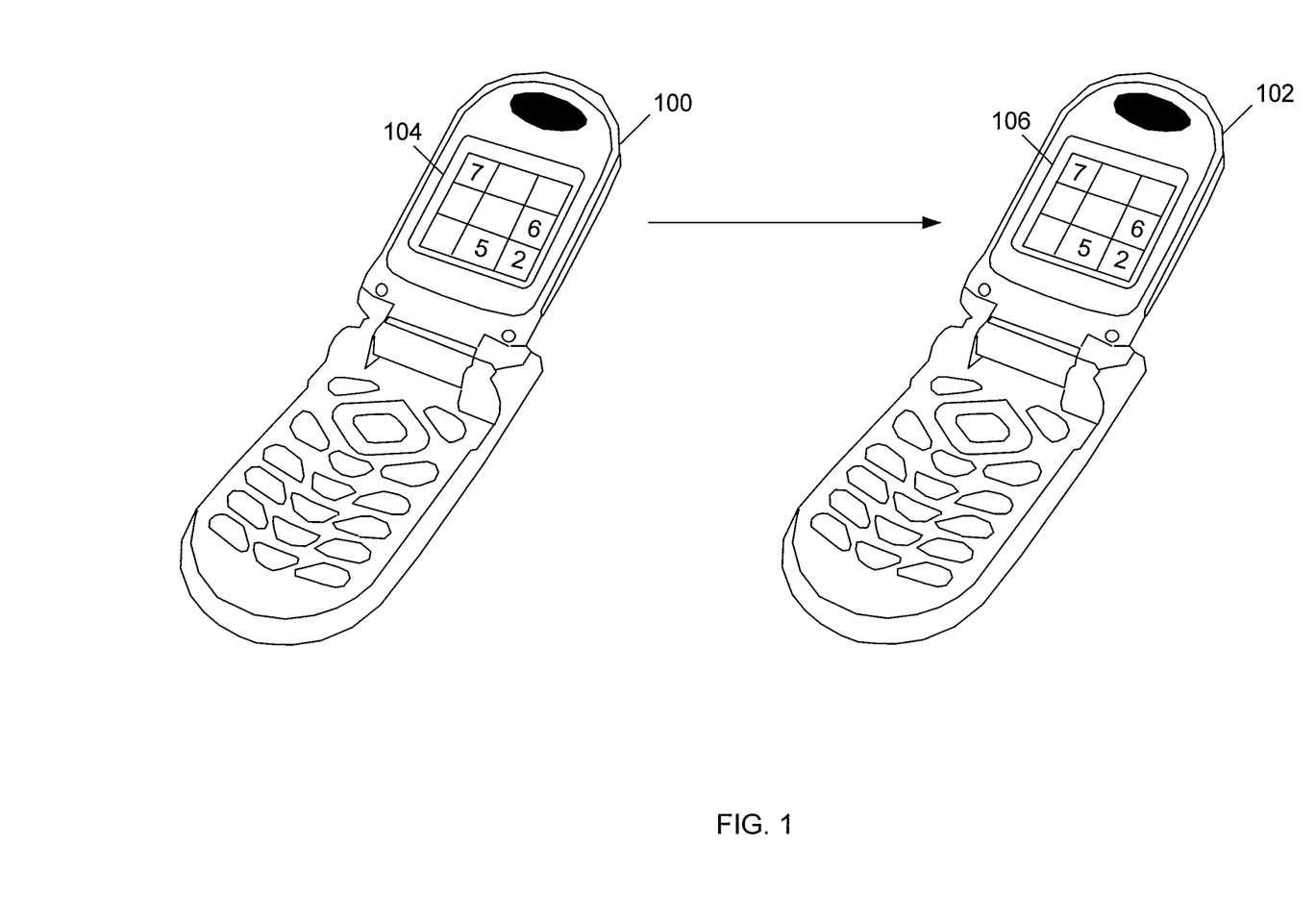
FIG. 1 is an illustration of two handheld devices.

Referring to FIG. 1, an established communication link is illustrated between a pair of handheld devices 100, 102 for exchanging information such as voice, video and data content. In this particular scenario an electronic version of a Sudoku game is being executed by each of the handheld devices 100, 102. For example, a player using handheld device 100 may be unable to complete a portion of the Sudoku grid shown in a display 104. As such, the player may initiate a data transfer from handheld device 100 to the handheld device 102 so that another player may view the state of the Sudoku grid. Upon being shown in a display 106, the second player may assist the first player by completing the displayed grid and sending the completed grid back to the handheld device 100.

With the expansion of the electronic gaming industry, more complex and intricate games are being developed that may allow even more players to participate. For example, some team oriented games may allow six or more players to simultaneously interact with a game. While cellular telephones may provide a platform for such game applications, other types of handheld devices may also be implemented. For example, personal digital assistants (PDAs), MPEG Layer 3 (MP3) players and other types of handheld devices may also be used to exchanging information such as a game status. Along with hardware variations, one or more signaling techniques and transmission methodologies may be implemented for information exchange. For example, techniques and standards associated with the Universal Mobile Telecommunications System (UMTS), Global System for Mobile communication (GSM) and the like may be implemented for establishing communication links. Standards associated with spread spectrum air interface protocols such as code division multiple access (CDMA), wideband CDMA (WCDMA), time division multiple access (TDMA), etc. may also be implemented for accessing handheld devices.

Figures 2, 3:
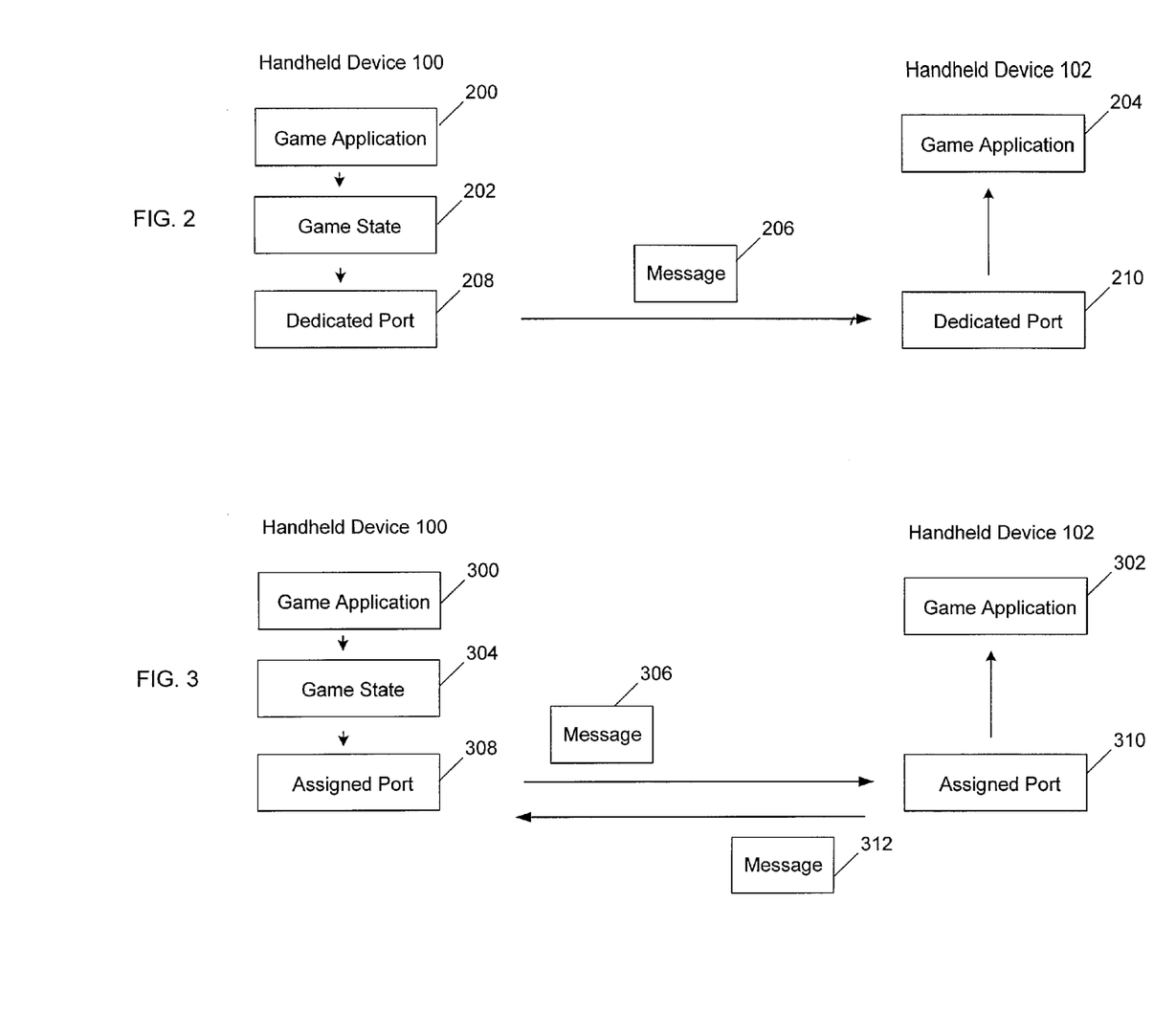
FIGS. 2 and 3 illustrate information exchange between two handheld devices.

Referring to FIG. 2, a block diagram illustrates one method for passing data (e.g., the state of a Sudoku game) from one handheld device (e.g., handheld device 100) to another (e.g., handheld device 102). A game application 200 being executed by the handheld device 100 may provide data that represents the current game state 202 (e.g., of a Sudoku game) for transmission to the other handheld device 102. Upon receipt, an instance of the application 204 executed on the second handheld device 102 may process the data (e.g., render the game state on a display of the handheld device) for presenting to another player.

A message 206 may be used to pass the game state 202 to the second handheld device. One or more formats and protocols may be used to produce the message 206, for example, text messaging such as Short Message Service (SMS) messaging may be implemented. In some arrangements SMS messaging may be available on digital GSM networks and allow text messages of approximately 160 characters or more exchanged between handheld devices. For transmission, a port 208 of the first handheld device 100 passes the message 206 to a port 210 of the second handheld device 102. In some implementations a port is considered an endpoint to a logical connection. Each handheld device typically has a fixed number of ports that are dynamically assigned as needed by the applications executed by the handheld devices. For example, both of the handheld devices 100, 102 may assign a port for passing messages between the two executed application instances 200, 204. These assigned ports may have the same identification number (e.g., port 20) or have different identification numbers (e.g., port 20 for handheld device 100 and port 1 for handheld device 102). Thus, to transmit messages, each handheld device would need to track port assignments of the linked handheld devices.

In various implementations, to reduce this tracking complexity, a dedicated port is assigned to the application of the executed application instances 200 and 204. For example, a particular port number may be globally assigned to an application, thereby, the same port of all manufactured handheld devices would be dedicated to that one application. In this illustration ports 208 and 210 of respective handheld devices 200 and 204 are dedicated to the application from which the application instances 200 and 204 are executed. As can be imagined, arranging for a globally dedicated port may be a time consuming and expensive exercise. For example, a governing organization such as the Internet Assigned Numbers Authority (IANA) may be needed to provide approval for the global assignment of a port. Additionally, if ports are globally assigned to numerous well known applications, lesser known applications may be unable to function properly due to a lack of ports.

Referring to FIG. 3, another methodology for exchanging information between instances of an application executed at two handheld devices is illustrated. Similar to FIG. 2, two respective game application instances 300 and 302 exchange information. In particular, a game state 304 of the application 300 is represented in a message 306 that is passed to the handheld device 302. Rather than use a port globally dedicated to the application, the ports are independently assigned by the respective handheld devices. For example, a port 308 is assigned to the application instance 300 by the handheld device 100. Similarly, handheld device 102 assigns a port 310 to the application instance 302 (executed on that handheld device). Generally, each handheld device assigns the respective ports 308, 310 from a pool of ports. Thus, the assigned ports may or may not be equivalent, for example, port number 20 (of handheld device 100) may be the assigned port 308 while port number 1 (of handheld device 102) may be the assigned port 310. Since neither handheld device is aware of the port assigned by the other handheld device, port information needs to be exchanged between the devices. For example, a message 306 may be sent to alert handheld device 102 that the port 308 has been assigned to application 300. Correspondingly, another message 312 may be sent (from handheld device 102) to alert handheld device 100 that the port 310 has been assigned to the application instance 302. To exchange such messages (e.g., message 306 and 312), often a user needs to manually insert information into the messages such as the port number and the cellular telephone number.

In this implementation, ports may be assigned as needed in a dynamic manner. For example, if either handheld device malfunctions (or is inadvertently powered down), upon resuming operation, new ports (and different ports) may be assigned to the applications 300, 302. As such, additional messages may need to be sent so that both handheld devices 100, 102 are aware of the port being used by the other. Thus, time and resources may be repeatedly needed to identify the ports being used by each handheld device. While exchanging port numbers between two handheld devices may not considerably tax resources, additional handheld devices (e.g., six) may cause an escalation of time and processing needs.

Figure 4:
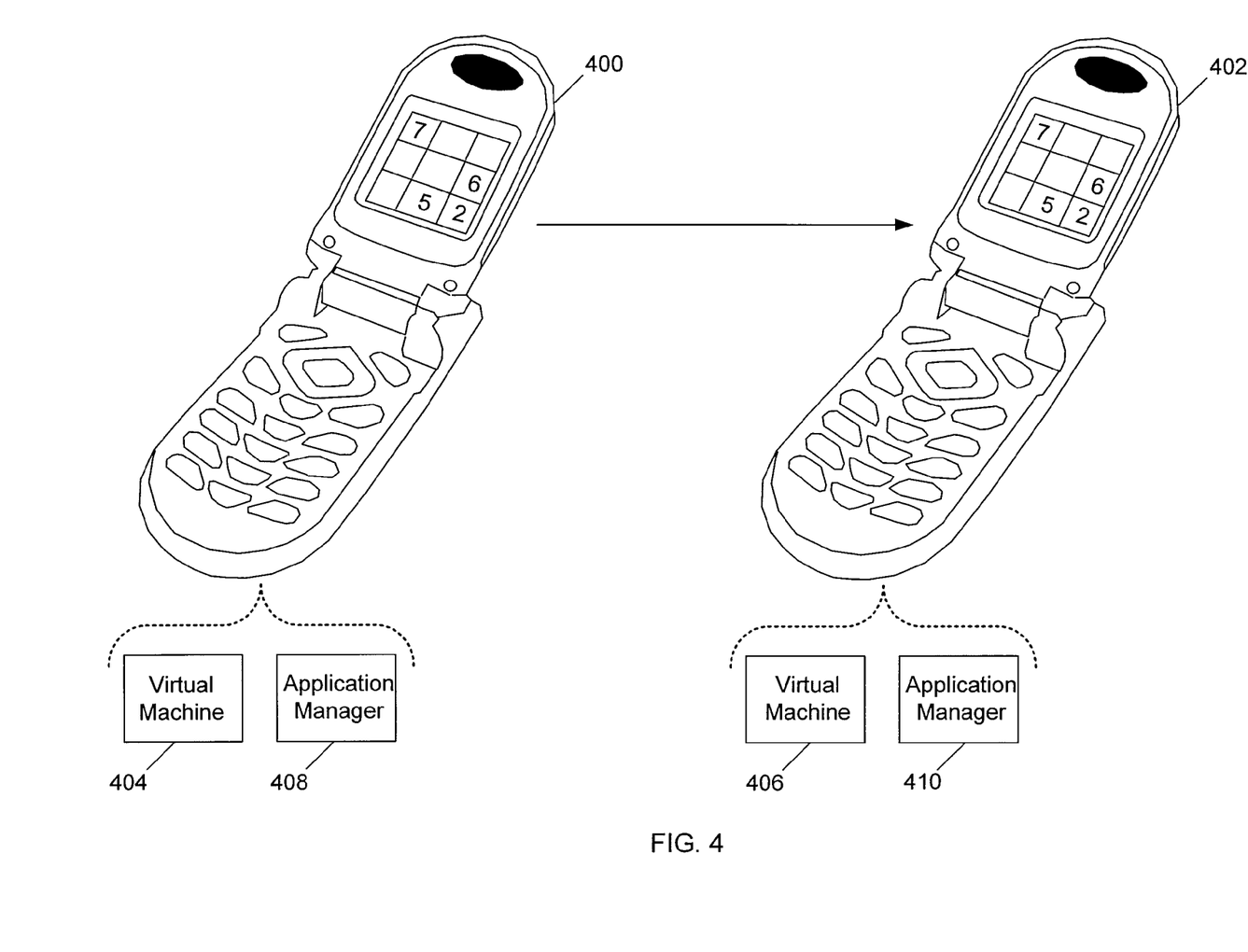
FIG. 4 illustrates two linked handheld devices.

Referring to FIG. 4, two handheld devices are presented that may execute applications and exchange information and data by using a virtual machine on each device. In particular, handheld devices 400 and 402 may exchange data (e.g., the current state of a game) by using virtual machines 404 and 406 respectively present at each device. Generally, the virtual machines 404, 406 may be considered multimedia and application players that may execute applications written specifically for the machines. For example, the virtual machines 404, 406 may be Adobe Flash Players or Adobe Flash Lite™

(a version of Adobe Flash Player for handheld devices such as cellular telephones) from Adobe Systems Incorporated, of San Jose, Calif. Virtual machines such as Adobe Flash and Adobe Flash Lite may implement vector and raster graphics, a script language and bidirectional streaming of video and audio. Virtual machines may also provide a virtualized abstract machine environment between a computing and its operating system. Applications for virtual machines are generally machine independent. Virtual machines may be single threaded or multi-threaded, and can include one or more operating system processes. Typically, virtual machine applications are written in a high-level language, which is translated to a machine-independent byte code. The byte code is converted to machine-specific instruction before or during execution of the application. Both of the virtual machines 404, 406 may be stored in a memory (e.g., random access memory (RAM), read-only memory (ROM), static RAM (SRAM), dynamic RAM (DRAM), etc.) and/or a storage device (e.g., a hard drive, etc.) included in each of the handheld devices 400, 402.

In this implementation, the same port of each handheld device is assigned to the virtual machine executed by the handheld device. For example, one port (e.g., port 20) of handheld device 400 is assigned to virtual machine 404 and the same port (e.g., port 20) is assigned to the virtual machine 406. Thus, one port is globally assigned to the virtual machine for all handheld devices, and thereby, is also assigned to the applications executed by the virtual machine. For example, each of the different types of game applications executed by the virtual machine may use the port assigned to the virtual machine. So, once the virtual machine is granted global assignment of a port, each application executed by the virtual machine may use the assigned port (without each individual application needing to be entered into an approval process).

In this implementation, an application manager is executed by each handheld device and assigns a unique identifier to the respective application instance being executed on each handheld device. For example, application managers 408 and 410 are respectively executed on the handheld devices 400 and 402. By assigning an identifier, each handheld device can store information to identify which handheld device is also executing an instance of the application (e.g., a multi-player game). Additionally, each application instance may identify itself in one or more messages sent from the handheld device executing the application instance. For example, a relatively small identifier (e.g., a four bit number) may be inserted in each message to identify the source application instance. As such, a small amount of message space is needed to identify the application instance.

Figure 5:
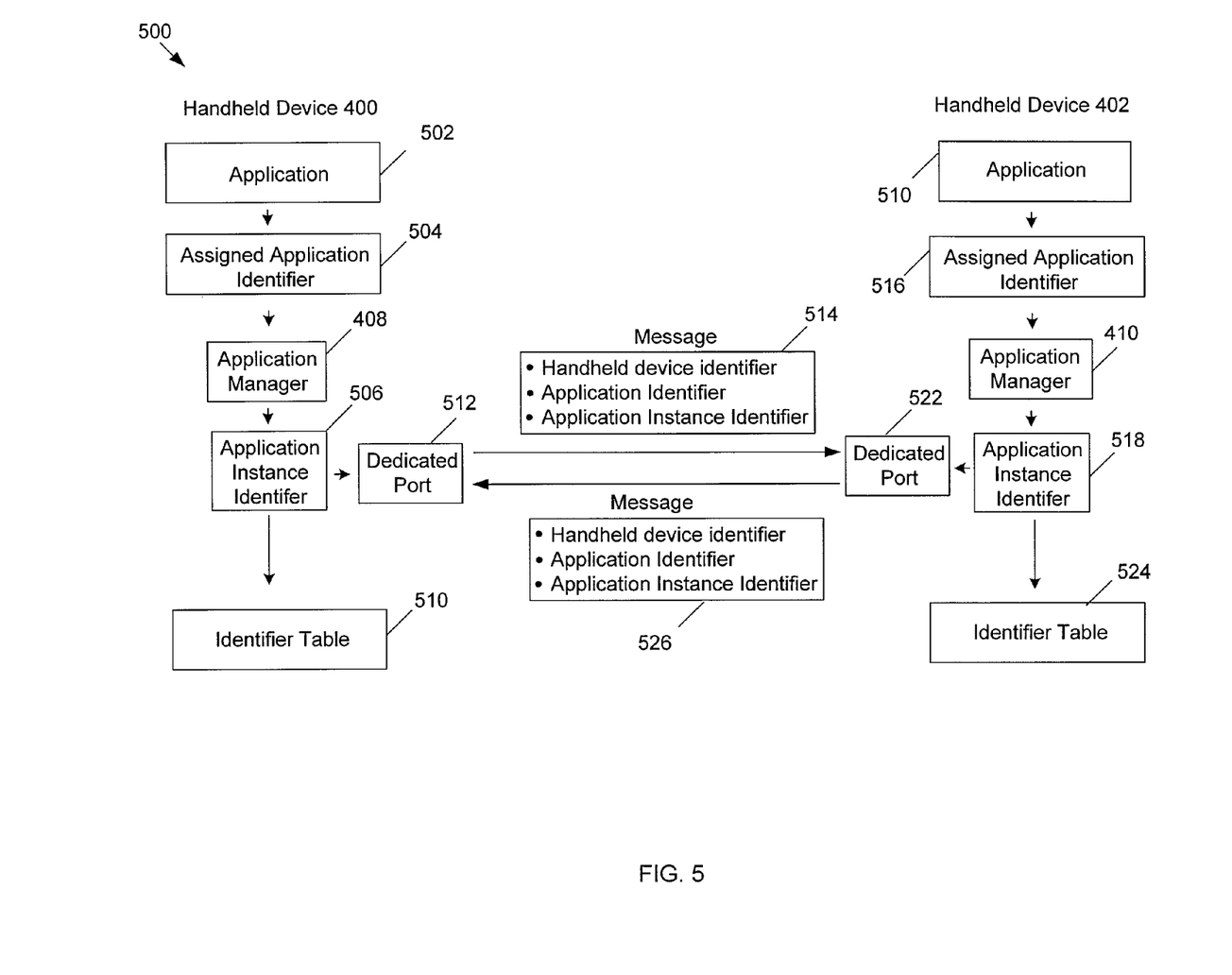
FIG. 5 illustrates information exchange between two handheld devices with virtual machines.

Referring to FIG. 5, a block diagram 500 is illustrated that represents using a virtual machine and assigning identifiers to application instances. Upon being selected, an application 502 (e.g., a game application) may be executed by the handheld device 400. The application 502 may have been assigned an identifier 504 (e.g., string of alpha-numeric characters, a Uniform Resource Locator (URL) address, etc.) by an enterprise such as an application developer, distributor, etc. The application identifier 504 may be used by the application manager 408 to produce and assign an application instance identifier 506 for the application instance executed by the virtual machine 404. Typically, the application instance identifier needs a relatively small amount of memory (e.g., four bits) to be represented. Along with being placed in messages (e.g., SMS messages) to identify the application instance (to other instances executed on other handheld devices), the application instance identifier 506 may also be stored (e.g., in an identifier table 510) for later use by the handheld device 400.

For message and information exchange with other handheld devices, a port 512 capable of message reception and transmission is dedicated to the virtual machine 404. By dedicating a port to the virtual machine, port assignments need not be transmitted to other handheld devices for tracking and to ensure proper message delivery. Rather, the assigned application identifier, which uses a relatively small amount of message space, may be used for identifying the application instance executed by the handheld device. For example, once the application 502 is executed, an initial message 514 (e.g., an SMS message) may be sent to other handheld devices also executing an instance of the application. Along with a handheld device identifier (e.g., the telephone number assigned to a cellular telephone), the application identifier 504 (e.g., assigned by the application developer) and the application instance identifier 506 are included in the message 514. By providing this information, one or more other handheld devices may be able to identify the application instance being executed by the handheld device 400 and begin to exchange messages. For example, two or more handheld devices executing a multi-player game may begin to exchange messages for game play over the port globally dedicated to the virtual machine.

In this example, the message 514 is provided to the exemplary handheld device 402, which is illustrated as also executing another instance 510 of the application 502. Similar to the handheld device 400, the application 510 executed by the handheld device 402 has been assigned an application identifier (e.g., by the application developer) which may be equivalent to the identifier 504 (since the same application is being executed on both handheld devices). The application manager 410 executed by the handheld device 402 also assigns an application instance identifier 518 to the application being executed. Since a port has been globally assigned to the virtual machine, a port 522 equivalent to port 512 is assigned to the virtual machine 406 of handheld device 402 for exchanging messages.

Upon receiving the message 514 from the handheld device 400, the handheld device 402 may extract information from the message for identifying the application 502 and the assigned application instance identifier 504. By comparing the application identifier included in the message 514 with application identifiers (e.g., application identifier 516) stored by the handheld device 402, the handheld device may determine if a common application is being executed by both of the handheld devices (if not more handheld devices). Information from the message 514 may also be stored by the handheld device 402 to track the applications being executed at other handheld devices. For example, some or all of the information included in message 514 may be stored in an identifier table 524 present in memory (not shown) of the handheld device 402. Additionally, the stored information (e.g., the application instance identifier 506) may be used for directing messages back to the handheld device 400.

In this illustration, the handheld device 402 sends a return message 526 to the handheld device 400 to provide similar information. For example, identifying information (e.g., telephone number) of the handheld device 402 is provided in the message 526 along with the identifier 516 of the application executed on the handheld device 402 and the identifier 518 assigned to executed application instance. Similar to storing the information in the message 514 in the identifier table 524, the information included in the return message 526 may be stored in the identifier table 510 for relatively fast directing of additional messages from the application instance 502 to the application instance 510 executed by the handheld device 402.

Figure 6:
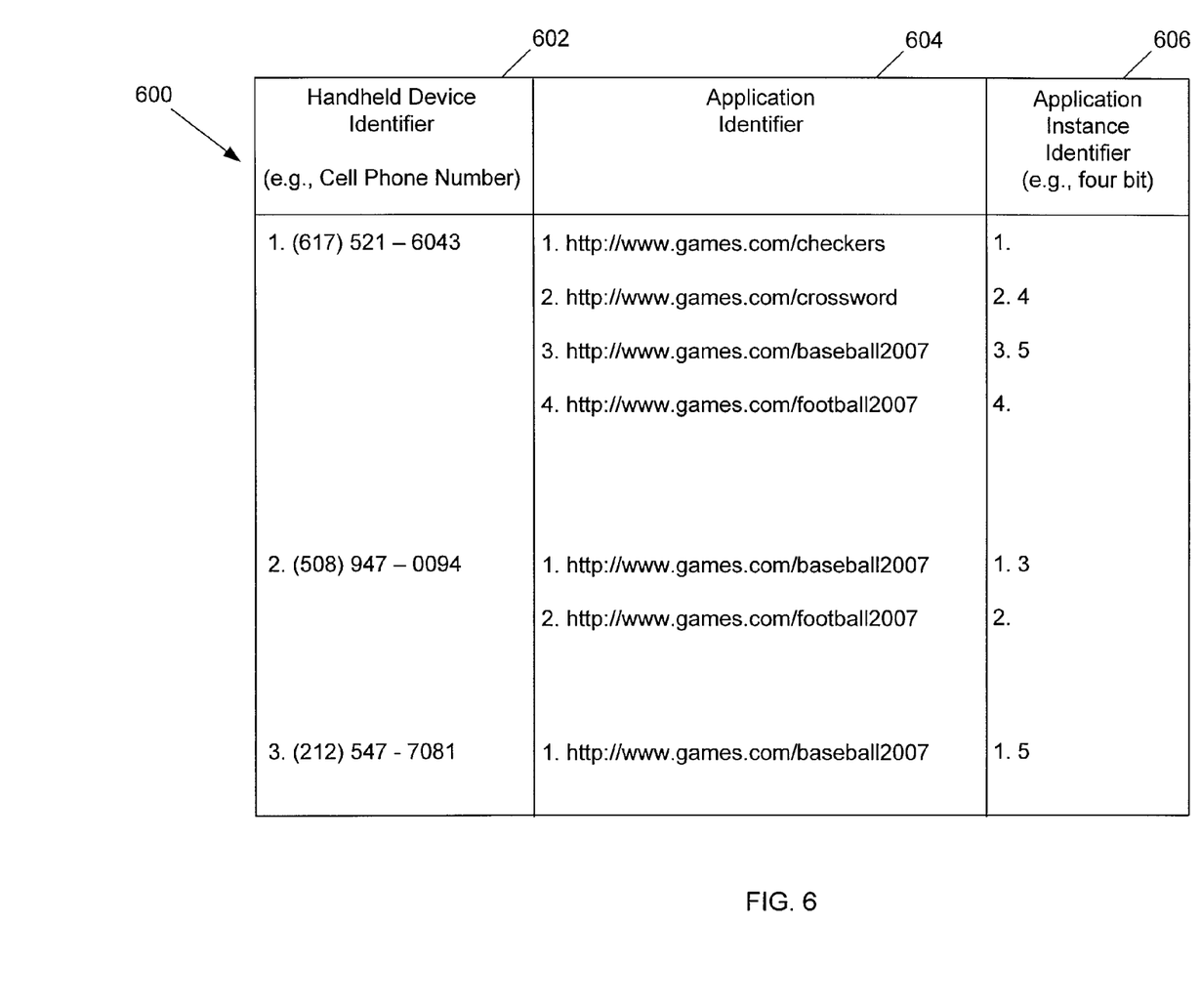
FIG. 6 is a chart that includes identifiers for exchanging information.

Referring to FIG. 6, a chart 600 includes information that may be stored by each handheld device (e.g., stored in identifier tables 510 and 524). The information may be stored in various format types and representations based upon, for example, the type and amount of respective memory present in the handheld device. In this implementation, the stored information includes a list 602 of handheld device identifiers. A unique entry is stored to the list 602 for each handheld device that sends an initial message to this handheld device. For example, the telephone number of each cellular telephone that sends a message may be stored to the identifier list 602. A list of application identifiers 604 may also be stored in the handheld device. As described above, the application identifiers may be uniquely assigned to each application by the application developer. Combinations of alpha-numerical characters may be used to uniquely identify each application, for example, an Internet resource address such as a URL may be used to identify each application.

In this illustration, handheld device number one has four executable applications while handheld device number two has two loaded applications and handheld device number three has one. As an application instance is executed with a virtual machine, a comparatively smaller application instance identifier is assigned (e.g., by an application manager) to each instance for subsequent message transmission. As such, one or more application instance identifiers may be inserted into a subsequent message for identifying the application instances to receive the message payload (e.g., a state of a game, data representing a players move, etc.). Since each application instance identifier may be represented in a relatively small amount of memory (e.g., four binary bits), a reduced amount of message space (e.g., message header, payload, etc.) is needed to identify the recipient application instance. In this illustration, a list of application instance identifiers 606 includes entries of four-bit application instance identifiers (represented in the figure in decimal equivalence) that have been assigned to two application instances of handheld device one while one application instance identifier has been assigned to respective application instances executed by handheld device two and three.

Figure 7:
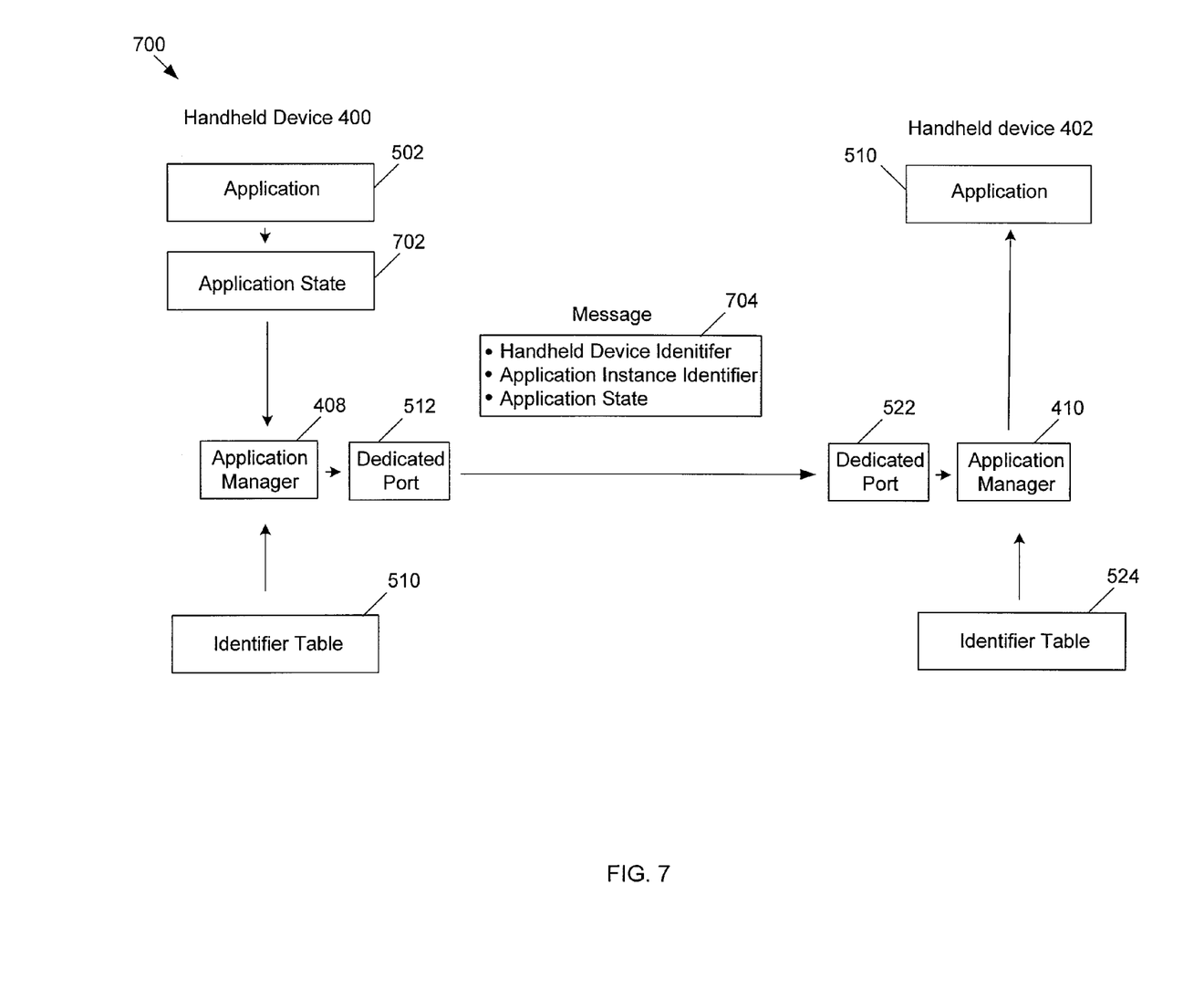
FIG. 7 illustrates information exchange between handheld devices with virtual machines.

Referring to FIG. 7, a block diagram 700 illustrates the handheld device 400 using information stored in the identifier table 510 to send subsequent messages to the handheld device 402. For example, after moving a representation of a game piece (e.g., a checker) of a game application being executed (e.g., application instance 502), the updated state of the game may be sent to the handheld device 402 for the next player move. Along with receiving data 702 that represents the state of the application (e.g., state of the game), the application manager 408 also receives data from the identifier table 510 that represents one or more other instances of the application being executed at other handheld devices. In this illustration, the game is also being played via the application instance 510 executed on the handheld device 402. To alert the player of application instance 510 to the changed application state 702, the application manager 408 produces a message 704 that is passed from the port 512 (dedicated to virtual machine 404) of the handheld device 400 to the dedicated port 522 of the handheld device 402. A relatively small amount of source and destination information need be inserted in the message 704 for proper delivery. For example, the appropriate handheld device identifier (e.g., cellular telephone number) may be inserted in the message 704 to direct the message to the handheld device 402. Additionally, the appropriate application instance identifier (e.g., a four bit number) is also inserted into the message 704 for delivering the application state data 702 to the executed application instance 510.

In some arrangements, the application manager 410 of the destination handheld device 402 may review the information stored in the message 704. For example, the application instance identifier may be reviewed and compared to the contents of the identifier table 524. If, for example, the comparison reveals that the application instance identifier (or other similar information) has changed, the application manager 410 may update the information of the identifier table 524. Furthermore, updating of the identifier table 524 may trigger one or more messages to be sent to other handheld devices as an alert to any changes to identifiers. Such operations may be advantageous since application instance identifiers may be assigned and re-assigned in a dynamic manner (e.g., an identifier may be re-assigned to an application instance upon a handheld device resuming operations after a malfunction).

Figure 8:
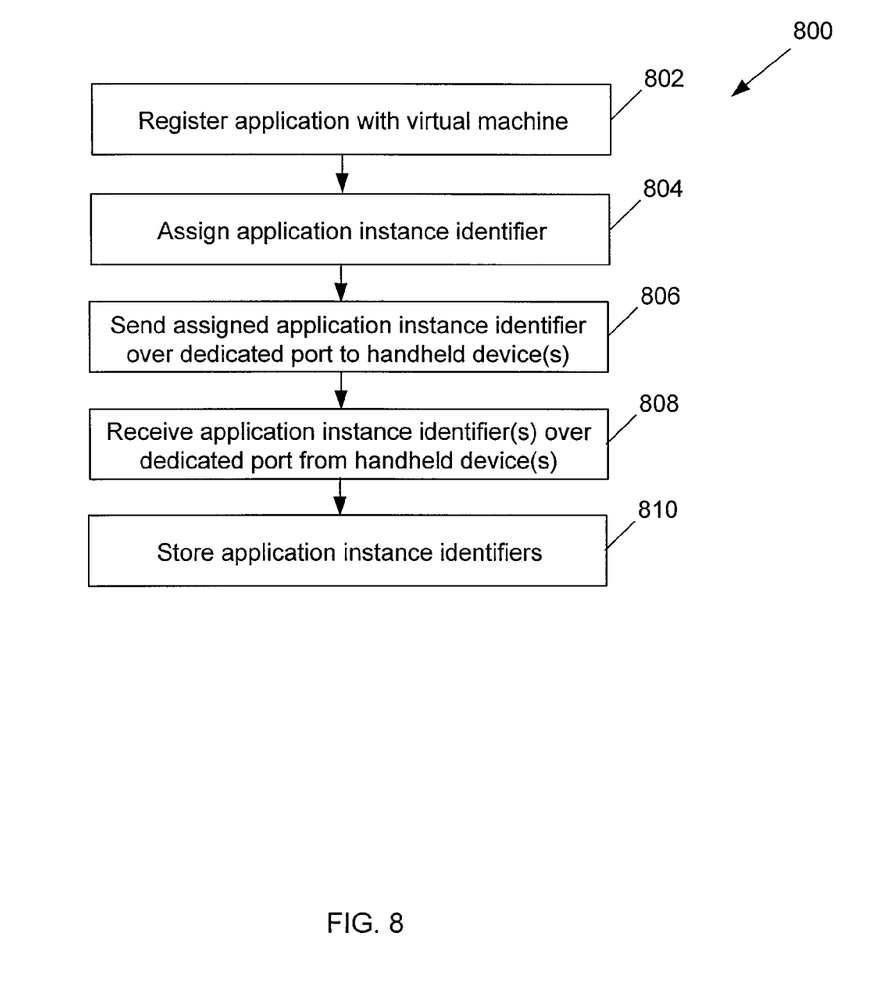
FIGS. 8 and 9 are flow charts of operations of an application manager.

Referring to FIG. 8, a flowchart 800 represents operations of the application manager 408 (shown in FIG. 4). Once loaded onto a handheld device, an executable application along with a corresponding application identifier (e.g., a URL site) may be registered 802 with a virtual machine present on the handheld device. For example, the application identifier may be stored (e.g., in an identifier table) for use in directing messages to other handheld devices. Upon the application being selected for execution, operations may also include assigning 804 an application instance identifier to the executed instance of the application. As mentioned above, the application instance identifiers may be represented with a relatively small amount of data (e.g., four binary bits) and may be used to direct message content (e.g., game player moves) to one or more appropriate application instances without consuming a significant amount of message space.

Operations may also include sending 806 the assigned application instance identifier over a dedicated port to one or more handheld devices. For example, a message containing the application instance identifier may be send over a port dedicated to the virtual machine to other handheld devices executing instances of the application (e.g., a multi-player game). One or more application instance identifiers may also be received 808 over the dedicated port from other handheld devices. For example, identifiers of instances of a multi-player game may be received for exchanging the identifiers for identification purposes. Along with the assigned application instance identifiers, received application instance identifiers may be stored 810, for example, in an identifier table for later access and use to exchange messages among the handheld devices.

Figure 9:
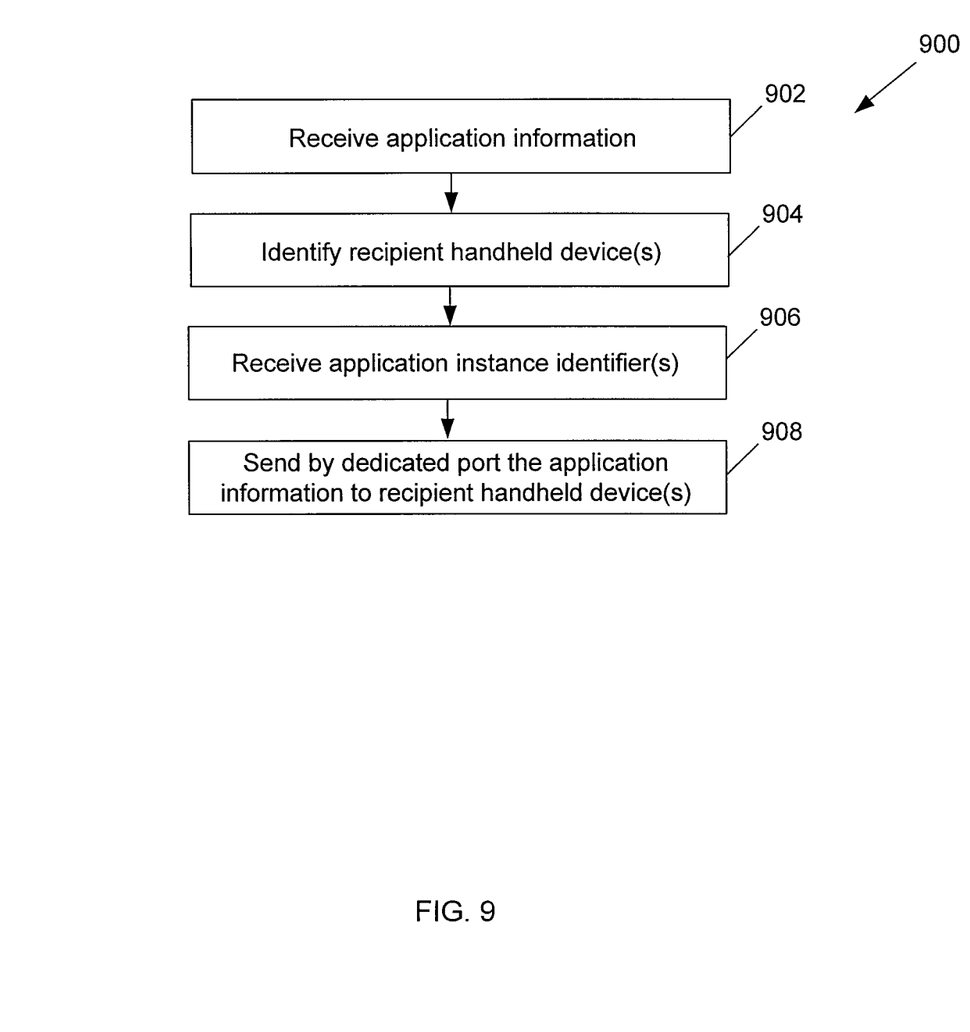

Referring to FIG. 9, a flow chart 900 represents additional operations of the exemplary application manager 408. For example, application instance identifiers may be used to exchange data among handheld devices that are each executing an instance of the application. Additionally, handheld device ports dedicated to virtual machines (of respective handheld devices) may be used to exchange the messages. As such, information identifying assigned ports need not be included in the messages. Operations may include receiving 902 information associated with an application instance being executed (e.g., state of a game, a player's movement of a game piece, etc.) and identifying 904 one or more handheld devices to receive this information. For example, an identifier table may be accessed to determine which, if any, counterpart handheld devices are executing similar application instances. Upon identification, application instance identifiers associated the identified handheld devices are received 906 for producing one or more messages. By sending 908 the messages over the dedicated port, the information may be provided to the appropriate instances of the application being executed.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method comprising:
   registering an application with a virtual machine operated by a processor of a first handheld device, the application having a universally assigned dedicated port, the universally assigned dedicated port being used to communicate data associated with the application with a plurality of handheld devices operating the application, the universally assigned dedicated port being different than ports assigned to other applications;
   launching, by the processor, a first application instance of the application on the first handheld device;
   assigning, by the processor, a first application instance identifier to the first application instance of the application;
   sending, by the processor, the first application instance identifier to a second handheld device over the universally assigned dedicated port to identify the first application instance to a second application instance of the application on the second handheld device, without sending a port assignment of the universally dedicated port of the application to the second handheld device;
   sending, by the processor, the first application instance identifier to a third handheld device over the universally assigned dedicated port to identify the first application instance to a third application instance of the application on the third handheld device, without sending the port assignment of the universally dedicated port of the application to the third handheld device.

2. The method of claim 1, wherein the first application instance identifier is sent to the second handheld device via a short message service (SMS) message.

3. The method of claim 2, wherein the first application instance identifier is sent in a format other than a Short Message Service (SMS) format.

4. The method of claim 1, further comprising:
   receiving a second application instance identifier at the first handheld device from the second handheld device.

5. The method of claim 1, wherein the application has an application identifier used to assign the first application instance identifier.

6. The method of claim 1, in which the first application instance identifier is unique to the first handheld device.

7. An apparatus comprising:
   a first handheld device comprising:
      a virtual machine configured to execute applications;
      a memory device, the memory device storing an assignment of a universally assigned dedicated port for an application, wherein the universally assigned dedicated port being used to communicate data associated with the application with a plurality of handheld devices, the universally dedicated port being different than ports assigned to other applications; and
      a processor configured to:
         register the application with the virtual machine;
         launch a first application instance of the application;
         assign a first application instance identifier to the first application instance of the application;
         send the first application instance identifier to a second handheld device over the universally assigned dedicated port to identify the first application instance to a second application instance of the application on the second handheld device, without sending a port assignment of the universally dedicated port of the application to the second handheld device;
         send the first application instance identifier to a third handheld device over the universally assigned dedicated port to identify the first application instance to a third application instance of the application on the third handheld device, without sending the port assignment of the universally dedicated port of the application to the third handheld device.

8. The apparatus of claim 7, wherein the universally dedicated port is configured to receive a second application instance identifier from the second handheld device.

9. The apparatus of claim 7, further comprising:
   the memory device having stored thereon an identifier table for storing the first application instance identifier.

10. The apparatus of claim 7, wherein the application has an application identifier used to assign the first application instance identifier.

11. The apparatus of claim 7, wherein the virtual machine includes Adobe Flash Lite™.

12. A computer program product comprising computer-readable instructions encoded on a computer-readable non-transitory medium, which when executed by a data processing apparatus, causes the data processing apparatus to perform operations comprising:
   registering an application with a virtual machine operated by a processor of a first handheld device, the application having a universally assigned dedicated port, the universally assigned dedicated port being used to communicate data associated with the application with a plurality of handheld devices operating the application, the universally assigned dedicated port being different than ports assigned to other applications;
   launching a first application instance of the application on the first handheld device;
   assigning a first application instance identifier to the first application instance of the application;
   sending the first application instance identifier to a second handheld device over the universally assigned dedicated port to identify the first application instance to a second application instance of the application on the second handheld device, without sending a port assignment of the universally dedicated port of the application to the second handheld device;
   sending the first application instance identifier to a third handheld device over the universally assigned dedicated port to identify the first application instance to a third application instance of the application on the third handheld device, without sending the port assignment of the universally dedicated port of the application to the third handheld device.

13. The computer program product of claim 12, wherein the first application instance identifier is sent to the second handheld device via a short message service (SMS) message.

14. The computer program product of claim 12, further comprising computer-readable instructions to cause the processing device to perform operations comprising:
    receiving a second application instance identifier at the first handheld device from the second handheld device.

15. The computer program product of claim 12, wherein the application has an application identifier used to assign the first application instance identifier.

16. The computer program product of claim 12, wherein the first application instance identifier is unique to the first handheld device.

\* \* \* \* \*